(12) United States Patent
Yoshizaki et al.

(10) Patent No.: US 6,576,332 B1
(45) Date of Patent: Jun. 10, 2003

(54) THERMOPLASTIC RESIN STRUCTURE

(75) Inventors: Michio Yoshizaki, deceased, late of Ichihara (JP), by Teruko Yoshizaki, legal representative; Kouichi Honda, Ichihara (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/868,134

(22) PCT Filed: Dec. 13, 1999

(86) PCT No.: PCT/JP99/06974
§ 371 (c)(1),
(2), (4) Date: Jun. 15, 2001

(87) PCT Pub. No.: WO00/35670
PCT Pub. Date: Jun. 22, 2000

(30) Foreign Application Priority Data

Dec. 16, 1998 (JP) ............................................. 10-357565

(51) Int. Cl.⁷ ................................................. B32B 3/26
(52) U.S. Cl. ..................... 428/304.4; 521/140; 528/176
(58) Field of Search .......................... 528/176; 521/140; 428/304.4

(56) References Cited

U.S. PATENT DOCUMENTS

| 5,702,810 A | 12/1997 | Koseki et al. |
| 5,916,672 A | 6/1999 | Reeves et al. |
| 6,106,750 A | 8/2000 | Hamanaka et al. |
| 6,197,144 B1 * | 3/2001 | Mahn, Jr. ................... 156/233 |

FOREIGN PATENT DOCUMENTS

| DE | 43 23 590 | 3/1994 |
| GB | 2 067 135 | 7/1981 |
| JP | 5-245991 | 9/1993 |
| JP | 06-234133 | 8/1994 |
| JP | 06-293039 | 10/1994 |
| JP | 6-344358 | 12/1994 |
| JP | 7-37613 | 7/1995 |
| JP | 08-090688 | 4/1996 |
| JP | 10-044898 | 2/1998 |

OTHER PUBLICATIONS

Patent Abstracts of Japan, vol. 017, No. 709 (M–1535), Dec. 24, 1993 & JP 05–245991 A (Shigeru Kogyo KK), Sep. 24, 1993.

Patent Abstracts of Japan, vol. 1995, No. 3, Apr. 28, 1995 & JP 06–344358 A (Inoac Corp.), Dec. 20, 1994.

* cited by examiner

*Primary Examiner*—Terressa M. Boykin
(74) *Attorney, Agent, or Firm*—Wenderoth, Lind & Ponack, L.L.P.

(57) ABSTRACT

The present invention provides a thermoplastic resin structure which has a three-layer structure of flexible skin layer/flexible foamed material layer/hard substrate layer wherein each of the layers comprises a thermoplastic resin capable of melt-adhesion with each other, and the flexible foamed material layer is formed by the injection foam molding method. The resin structure exhibits the capability of being easily recycled and, at the same time, can be produced at a low cost, which has not been achieved by a conventional structure using a cross-linked foamed sheet or a urethane foam, while maintaining the performance in appearance, cushioning, rigidity and the like, and thus markedly useful for application fields requiring high performance in cushioning, sound absorption, heat insulation and the like in automobiles, household electrical appliances, general industrial parts and the like.

8 Claims, 3 Drawing Sheets

THERMOPLASTIC RESIN STRUCTURE

This application is a 371 application of PCT/JP99/06974 filed Dec. 13, 1999.

TECHNICAL FIELD

The present invention relates to a structure comprising a thermoplastic resin. More specifically, it relates to a thermoplastic resin structure having a three-layer structure of flexible skin layer/flexible foamed material layer/hard substrate layer, which is excellent in cushioning and strength, and makes it possible to effectively reuse, i.e., recycle the used articles and to reduce costs.

BACKGROUND ART

Known three-layer structures of flexible skin layer/ flexible foamed material layer/hard substrate layer are shown as follows.

Conventional technique 1: a structure which comprises a slash molded product of polyvinyl chloride (hereinafter abbreviated as PVC) or a polyolefin thermoplastic elastomer (hereinafter abbreviated as TPO) as a flexible skin layer (hereinafter referred to as a skin layer), a polyurethane-foamed product as a flexible foamed material layer (hereinafter referred to as a foamed layer), and a polypropylene composite material or an injection-molded product of an ABS resin as a hard substrate layer (hereinafter referred to as a substrate layer).

Conventional technique 2: a structure which comprises a polypropylene composite material or an injection-molded product of an ABS resin as a substrate layer, and a sheet of a two-layer structure obtained by laminating a cross-linked foamed sheet of polypropylene or high density polyethylene as a foamed layer on a skin layer of PVC or TPO.

These structures have been used for automobile interior materials and have contributed greatly to the industrial fields as having excellent appearance, cushioning it, and rigidity.

In the conventional technique 1, however, foamed polyurethane, i.e., a thermosetting resin is used for the foamed layer, so that the skin layer, the foamed layer and the substrate layer should be separated when the structure is reused, i.e., recycled. Further, it is difficult to reuse foamed polyurethane, and therefore, the structure is not suitable for recycling which has been required worldwide in recent years.

The conventional technique 1 also has a disadvantage of high production cost, caused by quite different facilities required in the respective steps of a slash molding step of a skin layer, an injection or injection press molding step of a substrate layer and a urethane discharge-foaming step of a foamed layer.

In the conventional technique 2, a cross-linked foamed material is used for the foamed layer. When the three layers are recycled at the same time, the cross-linked foamed sheet is not homogeneously molten with materials constituting the skin layer and the substrate layer. The performance of the structure is therefore reduced when used as a recycled material. That is, the structure has a difficulty in recycling.

The conventional technique 2 also has a disadvantage of high production cost, caused by a long series of molding steps comprising a foamed sheet-molding step of a foamed layer, a step of laminating a skin layer on the foamed sheet, a step of pre-molding the resulting composite sheet by a vacuum molding method or a compress molding method, and a step of combining the resulting pre-molded product with a substrate layer to mold in a die by an injection or injection press molding method, and by the poor yield in pre-molding of the expensive composite sheet.

Further, both conventional techniques 1 and 2 described above use an adhesive or a pressure-sensitive adhesive so that at least a part of the respective layers adhere to each other, which may also cause difficulty in recycling of the structures and high costs.

The problems of difficulty in recycling and a high production cost in these conventional techniques are caused by that the layers, respectively having a good appearance, cushioning and rigidity, are produced from quite different materials or by quite different processing methods and combined. Such a structure may be superior in quality, but the above problems cannot be solved.

An object of the present invention is to provide a thermoplastic resin structure capable of being surely recycled and reducing costs while maintaining high performance in appearance, cushioning and rigidity, which has not been achieved by conventional techniques.

The present inventors have made intensive researches in order to obtain a thermoplastic resin structure capable of being surely recycled and reducing costs while maintaining high performance in appearance, cushioning and rigidity, which has not been achieved by conventional techniques. As a result, the inventors have found that a structure having a three-layer structure of a flexible skin layer, a flexible foamed material layer and a hard substrate layer, the respective layers comprising related thermoplastic resins capable of melt adhesion with each other, the flexible foamed material layer comprising an injection foam molded product, can be surely recycled and reduce costs, wherein the skin layer and the substrate layer can be combined at the same time of molding the foamed material layer, and this three-layer structure can easily be molten and reused only by pulverizing without separating the respective layers, whereby the present invention has been completed.

SUMMARY OF THE INVENTION

The constitution of the present invention is as follows.

(1) A thermoplastic resin structure having a three-layer structure of flexible skin layer/flexible foamed material layer/hard substrate layer, wherein the respective layers comprise thermoplastic resins capable of melt adhesion with each other and the flexible foamed material layer is formed by an injection foam molding method.

(2) The thermoplastic resin structure as described in the item (1), wherein the flexible skin layer and the hard substrate layer in the three-layer structure comprising the flexible skin layer, the flexible foamed material layer and the hard substrate layer are each thermally welded or thermally fused with the thermoplastic resin constituting the flexible foamed material layer by heat and pressure in injection foam molding of the flexible foamed material layer.

(3) The thermoplastic resin structure as described in the item (1) or (2), wherein the flexible skin layer, the flexible foamed material layer and the hard substrate layer in the three-layer structure each comprise polyolefin thermoplastic resins.

(4) The thermoplastic resin structure as described in any one of the items (1) to (3), wherein the flexible foamed material layer has an average expansion coefficient of 1.2 to 10.

EXPLANATION OF CODES

Figure 1:
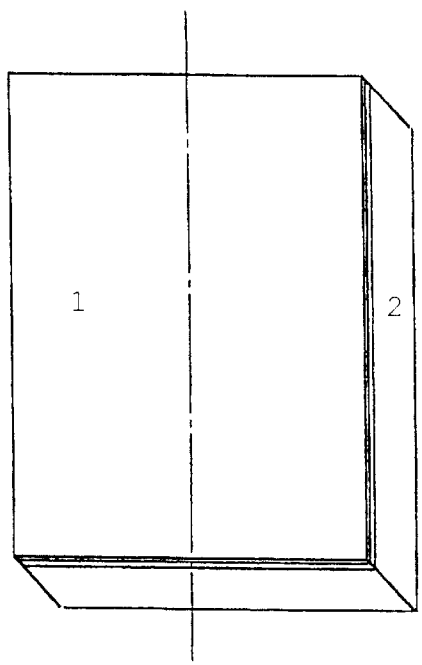
FIG. 1 is a perspective view of the surface of a box type structure equipped with a rib which is obtained in the example.
Figure 2:
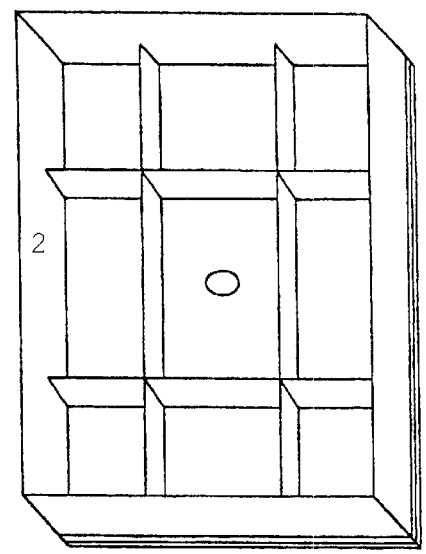
FIG. 2 is a perspective view of the back of the above structure.
Figure 3:
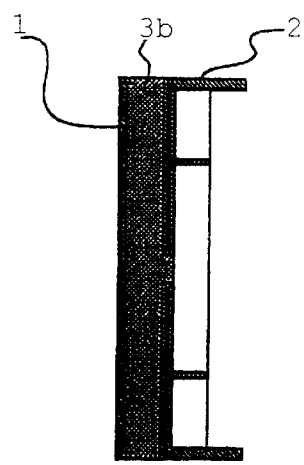
FIG. 3 is a cross section of the above structure.

1. Flexible skin layer
2. Hard substrate layer
3a. Flexible foamed material layer (non-foamed)
3b. Flexible foamed material layer (foamed)
4. Fixed die
5. Moving die
6. Gate
7. Nozzle of injection-molding machine

BEST MODE FOR CARRYING OUT THE INVENTION

A flexible skin material used for a flexible skin layer in the present invention is a film- or sheet-shaped molded product obtained by an injection-molding method or a calender roll molding method, and it is molded from a material capable of melt-adhesion with a flexible foamed material layer. A thermoplastic elastomer can suitably be used as the material used for the above flexible skin layer.

The thermoplastic elastomer shows a rubber elasticity at room temperature and can be molded in the same manner as conventional thermoplastic resins, and it may be completely cross-linked, partially cross-linked and non-cross-linked such as IPN (interpenetrated network). Any type can be applied in the present invention. Examples of the thermoplastic elastomer used in the present invention include polyolefin thermoplastic elastomers, styrene thermoplastic elastomers, isoprene thermoplastic elastomers, amide thermoplastic elastomers, ester thermoplastic elastomers and vinyl chloride thermoplastic elastomers.

Among them, polyolefin thermoplastic elastomers are preferred from a viewpoint of weight saving of the thermoplastic resin structure. Process oil may be blended in order to elevate a flexibility of the polyolefin thermoplastic elastomer. A completely cross-linked or partially cross-linked polyolefin thermoplastic elastomer may be blended with a peroxide and melt-kneaded, for example, in order to elevate a rubber elasticity of the above polyolefin thermoplastic elastomer.

The thermoplastic elastomer used as the flexible skin material in the present invention preferably has a flexural modulus of 500 MPa or less, more preferably 300 MPa or less at 23° C. Preferable is the elastomer having a melt flow rate (hereinafter abbreviated as MFR) of 0.1 g/10 minutes or more based on the test condition 14 (test temperature: 230° C.; test load: 21.18N) of JIS K7210. A MFR of less than 0.1 g/10 minutes may reduce the fluidity in molding, resulting in poor appearance of the molded product Band difficulty in molding a large-sized molded product.

If necessary, the above thermoplastic elastomer may be blended with a cross-linking agent such as organic peroxide, a lubricant, an antioxidant, a neutralizing agent, a pigment, a photo-stabilizer, a process oil such as a mineral oil and an antistatic agent which are used for conventional thermoplastic elastomers.

The thermoplastic elastomer used for the flexible skin material in the present invention is produced by a conventional method. For example, the polyolefin thermoplastic elastomer is produced by the following method. A crystalline ethylene-propylene copolymer and an ethylene-propylene copolymer rubber are blended by means of a tumbler, and melt-kneaded by means of a twin screw extruder (PCM-45 manufactured by Ikegai Tekko Co., Ltd.) at a cylinder temperature set to 200° C. to obtain a pelletized polyolefin thermoplastic elastomer.

An example of the material used as the flexible skin material in the present invention may be a polyolef in thermoplastic elastomer (TPO) in the case that all the three layers in the three-layer structure comprise polyolef in resins. In the case that the whole three-layer structure comprises a polyvinyl chloride resin, an example thereof may be a soft polyvinyl chloride resin which is a polyvinyl chloride thermoplastic elastomer.

A flexible foamed material used for the flexible foamed material layer in the present invention is preferably a material capable of melt-adhesion with the flexible skin layer and the hard substrate layer, which has a suitable fluidity for an injection foam molding method and a expansion coefficient of 1.2 to 10 or more. Specifically, the above-described thermoplastic elastomers as the flexible skin material can be used. In the case that the whole the three layer structure comprises a polyolefin resin, the above polyolefin thermoplastic elastomer can be blended with a propylene-ethylene random copolymer having a crystalline melting point of 125 to 150° C. in order to elevate an adhesion property of the flexible foamed material layer comprising the polyolef in thermoplastic elastomer to the hard substrate layer comprising a polyolef in resin described later.

A foaming agent for the flexible foamed material layer in the present invention is not particularly limited and can be any foaming agents conventionally used in a chemical foaming method or a gas foaming method described later. It may be known substances generating gas by chemical decomposition or volatile liquids which are used for plastics or rubber. Specifically, examples thereof include azodicarbonamide, dinitropentamethylenetetramine, p,p'-oxybisbenzenesulfonylhydrazide, p,p'-oxybisbenzenesulfonylsemicarbazide, N,N'-dimethyl-N,N'-dinitrosoterephthalamide, sodium hydrogencarbonate, trichloromonofluoromethane and dichlorodifluoromethane. Azodicarbonamide and dichlorodifluoro-methane are preferred. A typical amount of the foaming agents added is 0.01 to 10 parts by weight in the case of the chemical foaming method, and 0.1 to 100 parts by weight in the case of the gas foaming method, based on 100 parts by weight of the above thermoplastic elastomer.

The substrate used for the hard substrate layer in the present invention is a molded product, which is molded by an injection molding method or an injection press molding method and comprises a material capable of melt-adhesion with the flexible foamed material layer. A preferable material used for the hard substrate is a thermoplastic hard resin, for example.

Examples of the thermoplastic hard resin used in the present invention include polyethylene resins such as low density polyethylene, linear low density polyethylene and high density polyethylene; polypropylene resins such as crystalline propylene homopolymers, crystalline propylene-ethylene random copolymers and crystalline propylene-ethylene block copolymers; polyolefin resins such as poly (4-methylpentene-1); polystyrene resins; acrylonitrile-styrene copolymer resins; acrylonitrile-butadiene-styrene copolymer resins; methacryl-styrene copolymer resins; polyamide resins; polyethylene terephthalate resins; polybutylene terephthalate resins; and polycarbonate resins. Among them, the polypropylene resins are preferred because the thermoplastic resin structure can be decreased in weight. The above polypropylene resins preferably have an isotactic pentad ratio of 0.94 or more, more preferably 0.96 or more and a crystalline melting point of 163 to 165° C. so that the thermoplastic resin structure can have a high rigidity. They also preferably have a MFR of 10 to 40 g/10 minutes so as to readily form the molded product having a complicated shape and a small wall thickness.

The thermoplastic hard resin used in the present invention preferably has a flexural modulus of 600 MPa or more, more preferably 800 MPa or more at 23° C. Further, it has preferably a MFR of 5 g/10 minutes or more. If the thermoplastic hard resin has a MFR of less than 5 g/10 minutes, the fluidity in molding is reduced, resulting in poor appearance of the molded product and difficulty in molding a large-sized molded product.

If necessary, the thermoplastic hard resin used in the present invention may be blended with an inorganic filler such as talc, mica and glass fiber; a synthetic rubber which is compatible with the thermoplastic hard resin; and publicly known antioxidant, neutralizing agent, lubricant, antistatic agent and pigment which are used for conventional thermoplastic hard resins. The inorganic filler is preferably added to the thermoplastic hard resin in an amount of 5 to 60% by weight, more preferably 10 to 50% by weight and further preferably 15 to 40% by weight so that the thermoplastic resin structure has a high rigidity.

Examples of the material used for the hard substrate in the present invention include a talc-composite polypropylene resin and a glass fiber-composite polypropylene resin in the case that all the three layers in the three-layer structure comprise a polyolefin resin. In the case that the whole three-layer structure comprises a polyvinyl chloride resin, an example thereof may be a hard polyvinyl chloride resin.

The thermoplastic resin structure of the present invention can be obtained by molding a hard substrate layer in advance by an injection molding method or an injection press molding method, then molding a film- or sheet-shaped flexible skin layer by an extrusion molding method or a calender roll molding method, disposing both layers oppositely in a die with a space provided therebetween, charging a flexible foaming material into the space by the injection molding method or the injection press molding method and then expanding a cavity of the die to thereby foam the above flexible foaming material. In this case, the flexible skin layer and the hard substrate layer are each thermally welded or thermally fused with the material constituting the flexible foamed material layer by heat and pressure in charging the flexible foaming material.

A means for foaming the flexible foamed material layer in the present invention may be any of a chemical foaming method and a gas foaming method, and both the flexible skin layer and the hard substrate layer can preferably adhere on both outside faces of the foamed material layer by injection foam molding or injection press foam molding. Any foaming agent, regardless of the above-described kinds, may be used as long as it generates such an amount of gas as to achieve a prescribed average expansion coefficient. That is, it is required for the flexible foamed material layer in the present invention to be produced by charging a die with a molten thermoplastic elastomer for the flexible foamed material layer by an injection or injection press molding method and foaming it at a desired expansion coefficient.

The average expansion coefficient of the flexible foamed material layer in the present invention can be indicated by an approximate value obtained by dividing a volume of the foamed material layer in the product by a volume of a foaming thermoplastic elastomer charged into the space of a die. Specifically, when 200 ml of the foaming molten thermoplastic elastomer is charged to fill a space of 600 ml, the average expansion coefficient is 3 (=600 ml÷200 ml). However, the injection foam molding method is characterized in that an expansion coefficient is one, i.e., the elastomer is non-foamed or scarcely foamed, where a cavity is not expanded. Accordingly, the average expansion coefficient should be calculated excluding the part where the cavity is not expanded from a volume of the charged thermoplastic elastomer and a volume of the foamed material layer, respectively.

Specifically, assuming that a part where the cavity is not expanded has a volume of 50 ml in the molded article, the above-mentioned equation is calculated as follows.

$$(600-50) \text{ ml} \div (200-50) \text{ ml} = 3.666 \ldots$$

Thus, the average expansion coefficient is about 3.7.

On the assumption of the matter described above, the flexible foamed material layer in the present invention preferably has an average expansion coefficient of 1.2 to 10, more preferably 1.5 to 8, which may vary depending on parts of the foamed material layer according to the product shape or a dispersion of the foaming agent in the thermoplastic elastomer and a heat conduction of the foaming molten thermoplastic elastomer. If the flexible foamed material layer has an average expansion coefficient of less than 1.2, the layer feels hard even if the soft material is used. If the average expansion coefficient exceeds 10, the restoring force is reduced. The good cushioning is not obtained in either case.

EXAMPLES

The present invention shall further be explained in detail with reference to examples, but by no means limited thereto.

The followings are materials, an injection molding machine and a die used in the following examples and comparative examples.

1) Flexible Skin Layer Material A 100 parts by weight of a crystalline propylene-ethylene block copolymer (ethylene content: 11.0% by weight), 230 parts by weight of an ethylene-propylene-ethylidenenorbornene copolymer rubber (EPDM; brand name: EP57P manufactured by JSR Corporation) and 65 parts by weight of a process oil (brand name: DI Process Oil PW380 manufactured by Idemitsu Kosan Co., Ltd.) were mixed, and the mixture was extruded and pelletized to obtain a polyolefin thermoplastic elastomer (TPO) having a MFR of 0.5 g/10 minutes. This TPO was formed into a film having a wall thickness of 0.5 mm by means of a T-die extruder, thus giving a sheet-shaped flexible skin layer material A having a hardness of 74 as determined according to a hardness test A of JIS K6301.

2) Flexible Skin Layer Material B

A polyolefin thermoplastic elastomer (brand name: NEWCON NNT2005 manufactured by Chisso Corporation) having a MFR of 1.3 g/10 minutes was formed into a film having a wall thickness of 0.5 mm by means of a T-die extruder, thus giving a sheet-shaped flexible skin layer material B having a hardness of 85 as determined according to the hardness test A of JIS K6301.

3) Flexible Skin Layer Material C 100 parts by weight of a vinyl chloride polymer (average polymerization degree: 1,000) was mixed with 65 parts by weight of a plasticizer (DOP), and the mixture was formed into a film having a wall thickness of 0.5 mm by means of a calender roll apparatus, thus giving a sheet-shaped flexible skin layer material C having a hardness of 75 as determined according to the hardness test A of JIS K6301.

4) Flexible Foamed Layer Material 100 parts by weight of a crystalline propylene-ethylene block copolymer (ethylene content: 11.0% by weight) was mixed with 200 parts by weight of low density polyethylene (brand name: Suntec-LD L-1850A manufactured by Asahi Chemical Industry Co., Ltd.) and 200 parts by weight of an ethylene-propylene copolymer rubber (EPR; brand name: TAFMER P0080K manufactured by Mitsui Chemical, Inc.), and the mixture was pelletized to obtain a flexible material having a MFR of 18 g/10 minutes and a hardness of 87 as determined according to the hardness test A of JIS K6301. 94% by weight of this flexible material was blended with 6% by weight of a foaming agent masterbatch (brand name: Chisso Polypro XKP1310W manufactured by Chisso Corporation) prepared by blending 20% by weight of azodicarbonamide (ADCA) with 80% by weight of a crystalline propylene-ethylene-butene-1 random copolymer (ethylene content: 4.5% by weight; butene-1 content: 2.5% by weight) having a MFR of 6 g/10 minutes, and they were mixed and stirred by means of a tumbler mixer to obtain a flexible foamed layer material (ADCA content: 1.2% by weight).

5) Hard Substrate Layer A

A polypropylene composite material for an automobile interior material having a MFR of 20 g/10 minutes, which was prepared by blending 80% by weight of a crystalline propylene-ethylene block copolymer (ethylene content: 6.0% by weight) with 20% by weight of talc having an average particle diameter of 2 to 3 $\mu$m, was molded by means of a injection-molding machine and a die, each described below, so that the resultant molding has a length of 410 mm, a width of 295 mm, a height of 49 mm, and a wall thickness of 3 mm in a top board part. A hole 10 mm in diameter was drilled at the gate position as a passage for the flexible foamed layer material, thus giving a hard substrate layer A.

6) Hard Substrate Layer B

A hard substrate layer B was obtained in the same manner as the hard substrate layer A, except using glass-fiber reinforced polypropylene (brand name: Chisso Polypro GCS20 manufactured by Chisso Corporation) having a MFR of 2 g/10 minutes which was prepared by blending 20% by weight of glass fiber with 80% by weight of a crystalline propylene homopolymer.

7) Hard Substrate Layer C

A hard substrate layer C was obtained in the same manner as the hard substrate layer A, except using an ABS resin (brand name: Sevian-V VF512 manufactured by Daicel Chemical Industries, Ltd.) having a MFR of 5 g/10 minutes.

8) Injection-molding Machine

An injection-molding machine equipped with a ion cylinder having a screw diameter of 90 mm and a clamp-controlling mechanism, and having a maximum clamping force of 650 T.

9) Die

Figure 4:
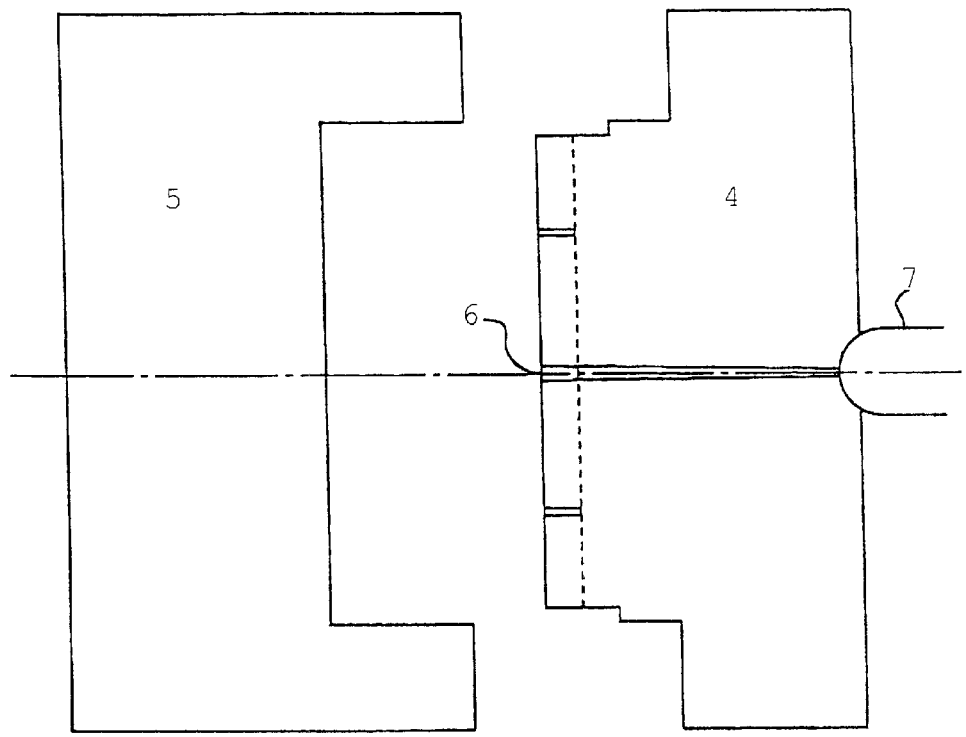
FIG. 4 is a cross section of a die used in the examples and the comparative examples.

A die for molding a box shown in FIG. 4, which is its equipped with a rib and has a length of 410 mm and a width of 295 mm, in which a height can be varied in a range of 47 to 60 mm and a wall thickness can be varied in a range of 1 to 14 mm.

Example 1

The materials and the molding apparatus described above were used to carry out the following example. The results thereof are shown in Table 1.

Figure 5:
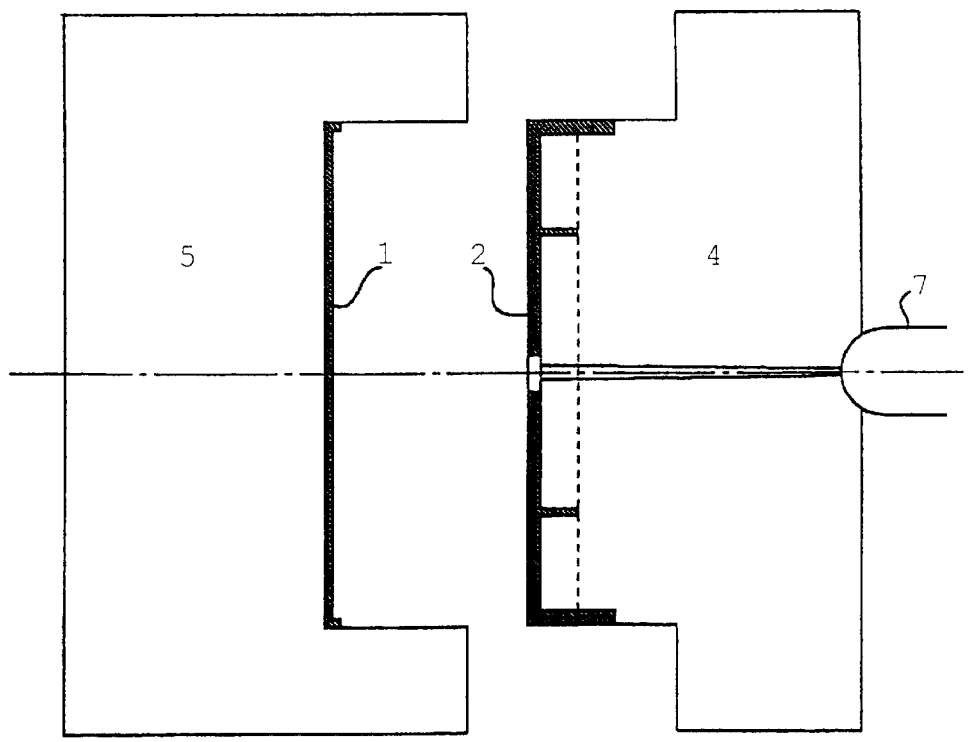
FIG. 5 is an illustration of a flexible skin layer 1 and a hard substrate layer 2 being set in the above die.
Figure 6:
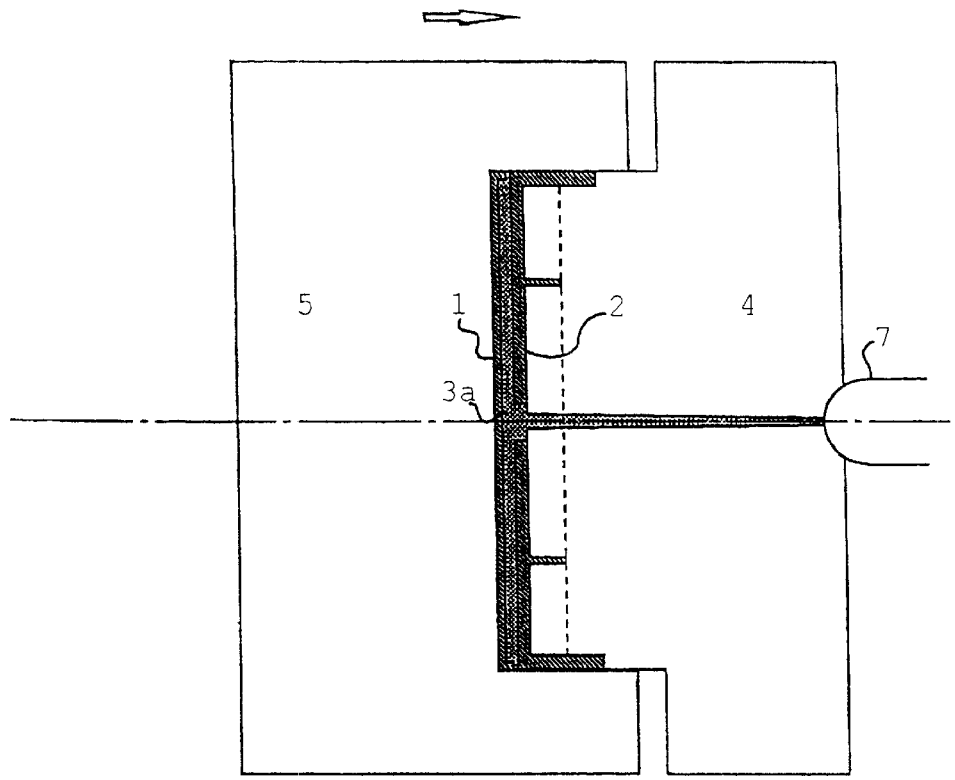
FIG. 6 is an illustration of a flexible foamed material layer (non-foamed) 3a formed by clamping the die in FIG. 5 while leaving space for charging a material for the flexible foamed layer, and injecting the material.
Figure 7:
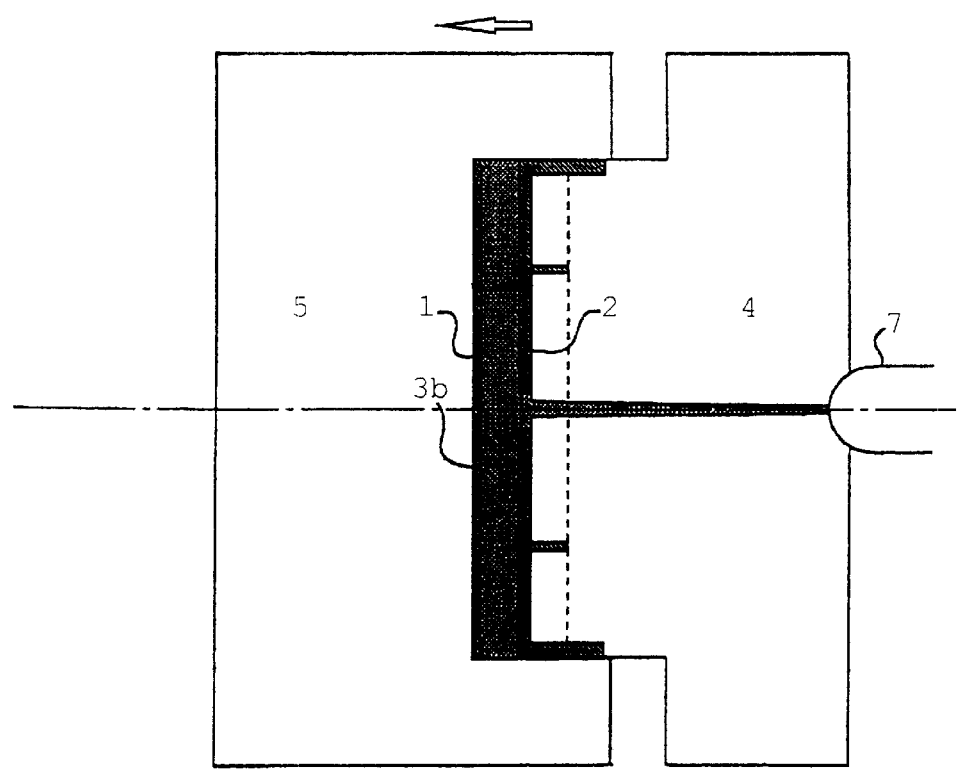
FIG. 7 is an illustration of a flexible foamed material layer (foamed) 3b formed by shifting the position of the die shown in FIG. 6 at a prescribed distance, foaming the material for the flexible foamed layer and maintaining the foamed layer.

The flexible skin layer material A having a wall thickness of 0.5 mm was cut according to a form of a die top face to obtain a flexible skin material layer A1, which was fit on a moving die 5 of the above-described die, wherein a height was adjusted to 51.5 mm and a wall thickness in the top board part was adjusted to 5.5 mm. Further, the hard substrate layer A2 having a wall thickness of 3 mm in the top board part, which was molded in advance, was fit on a fixed die 4 (See FIG. 5). Next, these dies were clamped, and a flexible foamed layer material was injected into a space of 2 mm between the flexible skin layer A1 and the hard substrate layer A2 to form a flexible foamed material layer (non-foamed) 3a having a wall thickness of 2 mm (See FIG. 6). After primary cooling for 2 seconds, the moving die 5 was shifted so that a wall thickness was adjusted to 9.5 mm in the top board part, and the flexible foamed layer material was foamed simultaneously with shift of the moving die 5 to form a flexible foamed material layer (foamed) 3b (See FIG. 7). Thereafter, secondary cooling was carried out for 60 seconds while maintaining the position of the die (FIG. 7), and then a molded product was taken out. In the molded product taken out, the flexible skin layer A1 having a wall thickness of 0.5 mm, the flexible foamed material layer (foamed) 3b having a wall thickness of 6 mm and the hard substrate layer A2 having a wall thickness of 3 mm firmly adhered to each other, and the flexible foamed material layer (foamed; average expansion coefficient=726 ml÷242 ml=3.0) 3b maintained a sufficient cushioning. Further, this molded product has the three-layer structure comprising materials of the same kind only, without using any adhesive or pressure-sensitive adhesive, so that it can be surely recycled.

Example 2

Molding was carried out in the same manner as in Example 1, except using the flexible skin layer material B for the skin layer and the hard substrate layer B2 as the substrate layer. The results thereof are shown in Table 1. In the molded product taken out, the flexible skin layer B1 having a wall thickness of 0.5 mm, the flexible foamed material layer (foamed) 3b having a wall thickness of 6 mm and the hard substrate layer B2 having a wall thickness of 3 mm firmly adhered to each other, and the flexible foamed material layer (foamed; average expansion coefficient=3.0) 3b maintained a sufficient cushioning. Further, this molded product has the three-layer structure comprising materials of the same kind only, without using any adhesive or pressure-sensitive adhesive, so that it can be surely recycled.

Comparative Example 1

Molding was carried out in the same manner as in Example 1, except using the flexible skin layer material C for the skin layer. The results thereof are shown in Table 1.

In the molded product taken out, the flexible skin layer C1 having a wall thickness of 0.5 mm and the flexible foamed material layer (foamed) 3b having a wall thickness of 6 mm did not adhere to each other and were readily peeled off from an end part of the molded product. Further, the flexible skin layer C1 at the gate was broken by melting, resulting in a notably damaged appearance of the flexible skin layer C1.

Comparative Example 2

Molding was carried out in the same manner as in Example 2, except using the hard substrate layer C2 as the substrate layer. The results thereof are shown in Table 1. In the molded product taken out, the flexible skin layer B1 having a wall thickness of 0.5 mm and the flexible foamed material layer (foamed) 3b having a wall thickness of 6 mm firmly adhered to each other, but the above flexible foamed material layer (foamed). 3b and the hard substrate layer C2 having a wall thickness of 3 mm did not adhere to each other and were readily peeled off from an end part of the molded product.

TABLE 1

|  |  | Example | | Comparative Example | |
|---|---|---|---|---|---|
|  |  | 1 | 2 | 1 | 2 |
| Skin layer | Flexible skin layer material A | Used | — | — | — |
|  | Flexible skin layer material B | — | Used | — | Used |
|  | Flexible skin layer material C | — | — | Used | — |
| Foamed layer | Flexible foamed layer material | Used | Used | Used | Used |
| Substrate layer | Hard substrate layer A | Used | — | Used | — |
|  | Hard substrate layer B | — | Used | — | — |
|  | Hard substrate layer C | — | — | — | Used |
| Results | Adhesion of skin layer to foamed layer | G | G | N | G |
|  | Adhesion of foamed layer to substrate layer | G | G | G | N |
|  | Surface cushioning | G | G | N to G | G |

Remark: As the codes for the results, G represents "good", and N represents "not good".

EFFECTS OF THE INVENTION

The present invention can provide a three-layer structure of a thermoplastic resin comprising a flexible skin layer, a flexible foamed material layer and a hard substrate layer, and capable of being readily recycled. Accordingly, it is very useful for application fields requiring high performance in cushioning, sound absorption, heat insulation and the like in automobiles, home electric appliances, general industrial parts and the like.

What is claimed is:

1. A thermoplastic resin structure having a three-layer structure of flexible skin layer/flexible foamed material layer/hard substrate layer, wherein the respective layers comprise thermoplastic resins capable of melt adhesion with each other and the flexible foamed material layer is formed by an injection foam molding method, in which the flexible skin layer and the hard substrate layer are each thermally welded or thermally fused with the thermoplastic resin constituting the flexible foamed material layer by heat and pressure in injection foam molding of the flexible foamed material layer.

2. The thermoplastic resin structure as claimed in claim 1, wherein the flexible skin layer, the flexible foamed material layer and the hard substrate layer in the three-layer structure each comprise polyolefin thermoplastic resins.

3. The thermoplastic resin structure as claimed in claim 1, wherein the flexible foamed material layer has an average expansion coefficient of 1.2 to 10.

4. The thermoplastic resin structure as claimed in claim 2, wherein the flexible foamed material layer has an average expansion coefficient of 1.2 to 10.

5. The thermoplastic resin structure as claimed in claim 1, wherein the flexible foamed material layer is formed by an injection foam molding method in which a flexible foaming material is foamed by expanding a cavity of a die.

6. The thermoplastic resin structure as claimed in claim 2, wherein the flexible foamed material layer is formed by an injection foam molding method in which a flexible foaming material is foamed by expanding a cavity of a die.

7. The thermoplastic resin structure as claimed in claim 3, wherein the flexible foamed material layer is formed by an injection foam molding method in which a flexible foaming material is foamed by expanding a cavity of a die.

8. The thermoplastic resin structure as claimed in claim 4, wherein the flexible foamed material layer is formed by an injection foam molding method in which a flexible foaming material is foamed by expanding a cavity of a die.

* * * * *